United States Patent [19]

Hayakawa et al.

[11] Patent Number: 5,092,201
[45] Date of Patent: Mar. 3, 1992

[54] HYDRAULIC CONTROL DEVICE FOR AN AUTOMATIC TRANSMISSION

[75] Inventors: Youichi Hayakawa, Toyoake; Yoshinari Kuwayama, Tokoname; Yoshihiro Yamada, Anjo, all of Japan

[73] Assignee: Aisin Aw Co., Ltd., Japan

[21] Appl. No.: 581,412

[22] Filed: Sep. 12, 1990

Related U.S. Application Data

[63] Continuation of Ser. No. 293,241, Jan. 4, 1989, abandoned.

[30] Foreign Application Priority Data

Aug. 31, 1988 [JP] Japan ................ 63-217953

[51] Int. Cl.⁵ .............. F16H 61/00; F16H 57/02
[52] U.S. Cl. ................... 74/867; 74/868; 74/606 R; 192/109 F
[58] Field of Search ............ 74/867, 868, 606 R; 192/109 F

[56] References Cited

U.S. PATENT DOCUMENTS

| | | | |
|---|---|---|---|
| 3,951,011 | 4/1976 | Lemon | 74/869 |
| 4,499,789 | 2/1985 | Kuramochi et al. | 74/752 C X |
| 4,628,774 | 12/1986 | Iwanaga | 74/867 |
| 4,727,774 | 3/1988 | Sumiya et al. | 74/868 X |
| 4,748,809 | 6/1988 | Sumiya et al. | 74/869 X |
| 4,823,637 | 4/1989 | Taguchi et al. | 74/867 X |
| 4,930,080 | 5/1990 | Suzuki | 192/109 F X |
| 5,033,331 | 7/1991 | Takada et al. | 74/867 |

Primary Examiner—Leslie A. Braun
Assistant Examiner—Khoi Q. Ta
Attorney, Agent, or Firm—Lorusso & Loud

[57] ABSTRACT

A check valve and an orifice are situated in a feeder oil passage to an accumulator so that influence of drained oil from the accumulator is eliminated when a hydraulic servo is drained. The hydraulic pressure is supplied to the servo through the orifice, and to the accumulator with the feeder oil passage separate from the oil passage to the hydraulic servo with the check valve being opened. When draining, the hydraulic pressure in the hydraulic servo is drained quickly, however, the hydraulic pressure in the accumulator is drained gradually because the check valve is closed.

3 Claims, 8 Drawing Sheets

| POSITION | | SOLENOID | | | CLUTCH | | | BRAKE | | | | O.W.C | | |
|---|---|---|---|---|---|---|---|---|---|---|---|---|---|---|
| | | S1 | S2 | S4 | C1 | C2 | C3 | B1 | B2 | B3 | B4 | F1 | F2 | F3 |
| P | | × | ○ | | | | | | | | ○ | | | |
| R | V≤7 | × | ○ | | | ○ | | | | ○ | ○ | | | |
| | V>7 | ○ | ○ | | | ○ | | | | × | ○ | | | |
| N | | × | ○ | | | | | | | | ○ | | | |
| D | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | ○ | | | | | ○ | | |
| | 4TH | × | × | ◎ | ○ | ○ | ○ | ○ | | | | | | |
| 3 | 1ST | × | ○ | | ○ | | | | | | ○ | | ○ | ○ |
| | 2ND | ○ | ○ | ◎ | ○ | | | ○ | ○ | | ○ | ○ | | ○ |
| | 3RD | ○ | × | ◎ | ○ | ○ | ○ | | | | | ○ | | |
| | (3RD) | × | × | | ○ | ○ | ○ | | | | | ○ | | |
| 2 | 1ST | × | ○ | | ○ | | | | | | ○ | | ○ | ○ |
| | 2ND | ○ | ○ | | ○ | | | ○ | ○ | | | ○ | | ○ |
| | (3RD) | ○ | × | | ○ | ○ | ○ | | | | | ○ | | |
| | (3RD) | × | × | | ○ | ○ | ○ | | | | | ○ | | |
| 1 | 1ST | × | ○ | | ○ | | | | | ○ | ○ | | ○ | ○ |
| | 2ND | ○ | ○ | | ○ | | | ○ | ○ | | | | | ○ ○ |
| | (1ST) | × | × | | ○ | | | | | ○ | ○ | | ○ | ○ |
| REMARKS | | ○ | ON | | APPLIED | | | | | | | | | |
| | | × | OFF | | RELEASE | | | | | | | | | |
| | | ◎ | ON: L-UP ON OFF: L-UP OFF | | | | | | | | | | | |

FIG. 4

FIG. 8
PRIOR ART
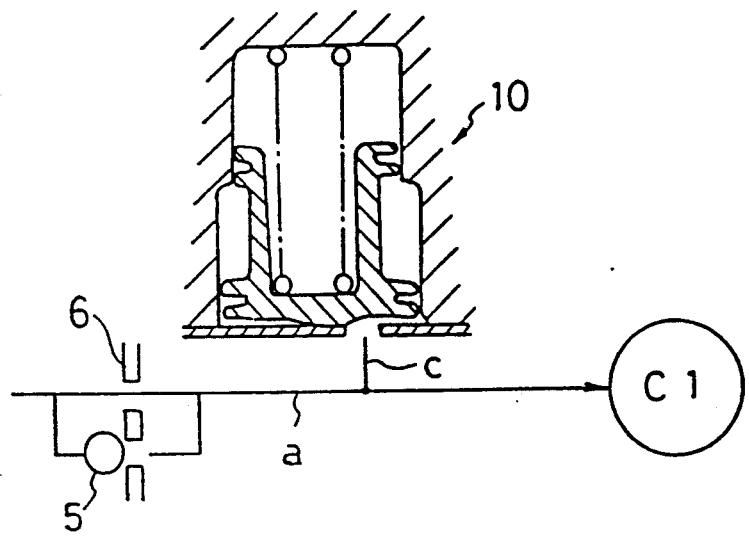
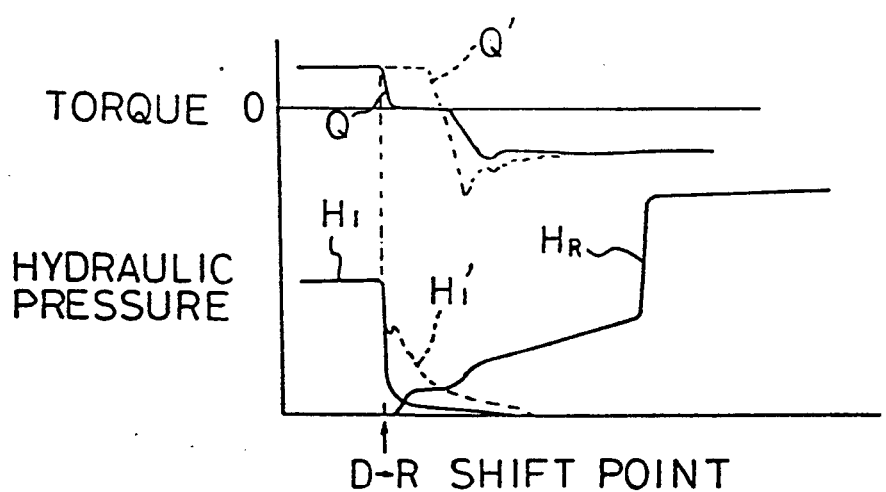
FIG. 9

HYDRAULIC CONTROL DEVICE FOR AN AUTOMATIC TRANSMISSION

This application is a continuation of application Ser. No. 293,241, filed Jan. 4, 1989, abandoned.

BACKGROUND OF THE INVENTION

1. Field of the Invention

The present invention relates to a hydraulic control device for an automatic transmission, in particular to an oil passage structure for a frictional engaging element having an accumulator.

2. Description of the Prior Art

Conventionally, an oil passage 'a' which is connected to a frictional engaging element such as a first (forward) clutch hydraulic servo C1, as shown in FIG. 8 is communicated with an accumulator 10 branched from the passage a, and upstream of the branched passage c, a check ball 5 and an orifice 6 are placed.

Due to the above arrangement, when hydraulic pressure is supplied to the oil passage a, the pressure is supplied to the hydraulic servo C1 and the accumulator 10 through the orifice 6. In accordance with the characteristics of the accumulator 10, the hydraulic pressure for the servo C1 rises, so that the hydraulic servo C1 is engaged smoothly.

When the oil passage a is drained, the hydraulic pressure in the servo C1 and the accumulator 10 are drained through the check ball 5.

With reference to the above mentioned structure, when the pressure is drained from the hydraulic servo C1, the draining pressure from the servo C1 is influenced by the draining pressure from the accumulator 10, which has comparatively much volume. Because of the above, though the draining is conducted through the check ball quickly, the hydraulic pressure of the servo C1, as shown in dotted lines in FIG. 9, has a draining characteristic H1' because the resistance of the oil passage caused by much oil flow from the accumulator 10.

In particular, in case that the hydraulic servo is a servo for a first (forward) clutch C1, when a manual shift lever is operated from the forward D range to the reverse range R through the neutral range N suddenly before the servo C1 is completely drained, the line pressure from the reverse port is supplied to a frictional engaging element which is engaged at reverse running (H$_R$). Under such condition, the first clutch hydraulic servo and the frictional engaging element for reverse running are both under torque-transmitting state. So, as shown in FIG. 9 by the dotted lines, transmission torque Q' is suddenly changed, so that shift shock may occur.

SUMMARY OF THE INVENTION

The present invention is purposed to provide, with the due consideration to the drawbacks of such conventional devices, a hydraulic control device for an automatic transmission, which quickly drains oil for a hydraulic servo when draining with eliminating an influence of an accumulator, in particular, which is used for a first (forward) clutch so to prevent occurrence of shift shock caused by sudden shift change from the D range to the R range.

The present invention, as shown in FIG. 1 for example, has the following provision: in a hydraulic control device for an automatic transmission, including a plurality of hydraulic servos for frictional engaging elements to connect or restrain certain elements of a shift gear mechanism, an accumulator (10) is connected to a certain hydraulic servo (C1) out of the plurality of hydraulic servos; a check valve (9) is situated in an oil passage (b) connecting the certain hydraulic servo (C1) and the accumulator (10) so that the check valve (9) block hydraulic flow draining from the accumulator (10), and an orifice (7) is situated in the oil passage (b) connecting the certain hydraulic servo (C1) and the accumulator (10) and is situated in parallel with the check valve (9).

And in case that the certain servo is a forward clutch hydraulic servo (C1), it is quite preferable to take full advantage of the present invention.

The accumulator (10) is situated in a rear cover (11) for the automatic transmission, and a hole (7a) for the orifice (7) and a hole (9a) for the check valve are axially constituted in the rear cover (11) so that the holes (7a), (9a) are connected to an oil passage (a) which is radially constituted in the rear cover (11).

Based on the above structure, when the hydraulic pressure is supplied to the oil passage (a), the pressure is supplied to the hydraulic servo (C1) through the orifice (6), and at the same time, supplied to the accumulator (10) through the feeder oil passage (b) with opening through the check valve (9). Due to this motions, the hydraulic pressure of the hydraulic servo (C1) rises in accordance with the certain characteristics of the accumulator (10). On the other hand, when the passage (a) is drained, the hydraulic pressure in the servo (C1) is quickly drained through the oil passage (a) and the check valve (5), however, the hydraulic pressure in the accumulator (10) is gradually drained through the orifice (7) because the check valve (9) is closed. As a result, the pressure in the hydraulic servo (C1) is drained with quick characteristic (H$_1$). as shown in FIG. 9, without having any influences of the draining hydraulic pressure form the accumulator (10).

Incidentally, the reference numerals in the parentheses are used only for reference with the drawings and do not limit the invention. The same number may be named differently in the following description and in the previous description in which broader concepts are adopted.

BRIEF DESCRIPTION OF THE DRAWINGS

In the drawings:

FIG. 4 is a table of operation of the automatic transmission.

FIG. 8 is a view showing the prior art, FIG. 9 is a graphical representation of the characteristics torque and hydraulic pressure.

DETAILED DESCRIPTION OF THE PREFERRED EMBODIMENTS

The present invention will now be explained along with the drawings.

Figure 2:
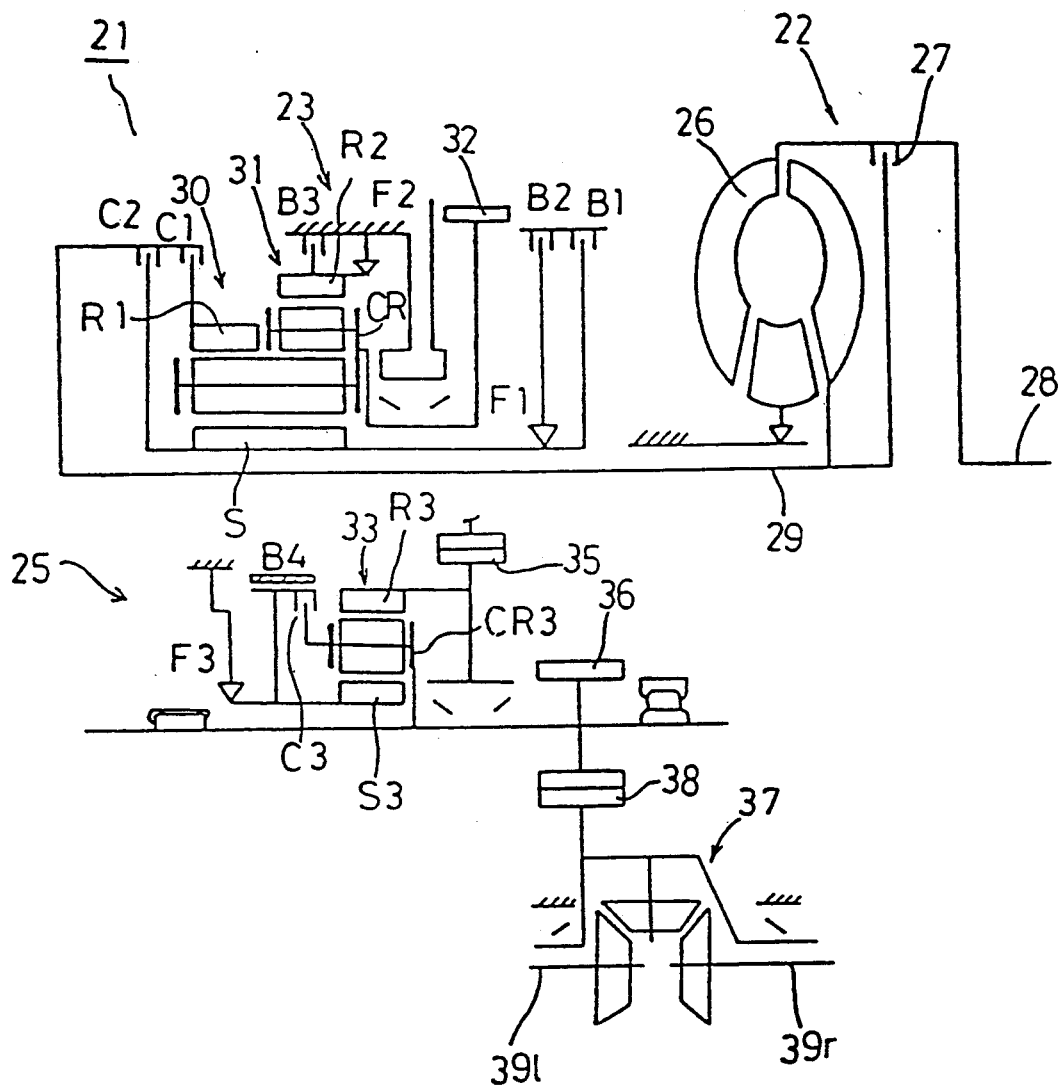
FIG. 2 is a schematic illustration of an automatic transmission suitable for the present invention, FIG. 3 i a hydraulic circuit diagram of the automatic transmission.
Figure 5:
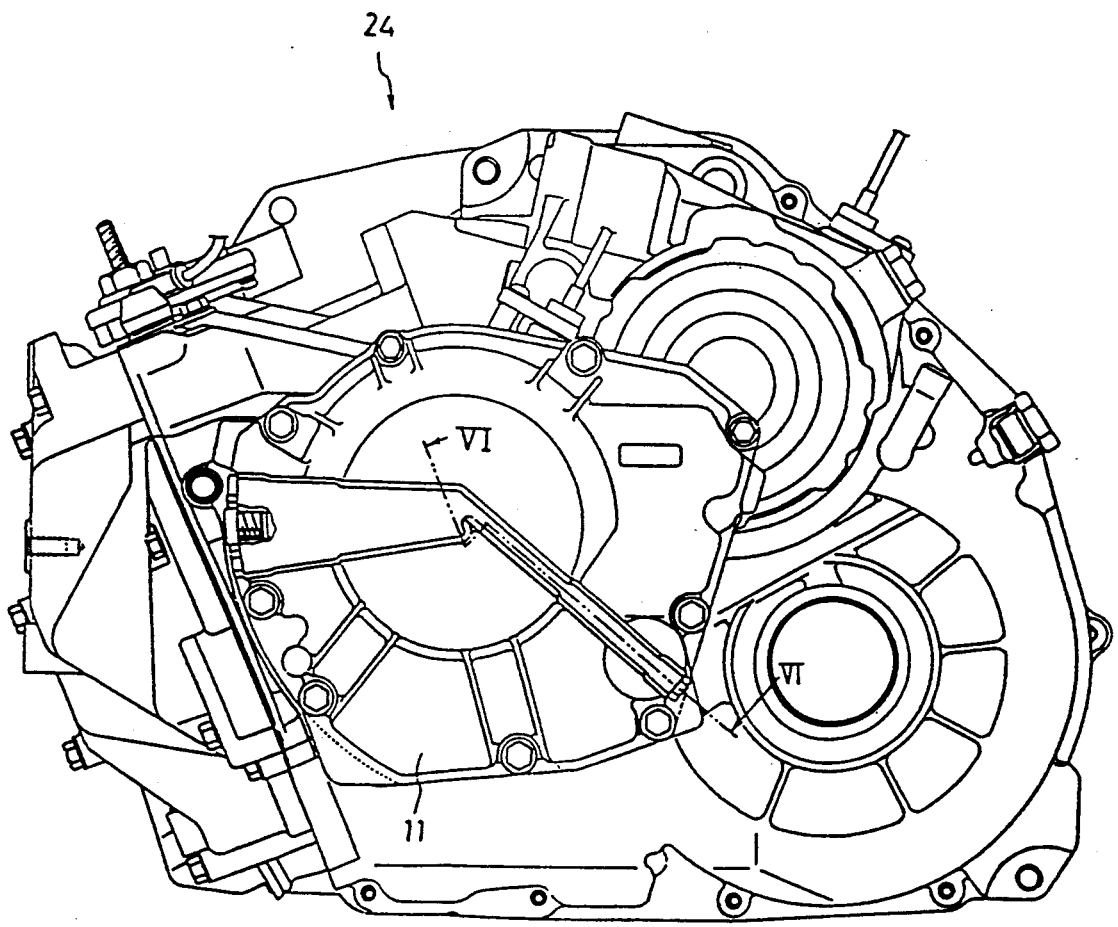
FIG. 5 is a front elevation of an integral case which the automatic transmission is housed.

Now referring to FIG. 2, a four speed automatic transmission 21 includes a three speed automatic transmission mechanism 23, a torque converter section 22, and an under drive mechanism 25. The four speed automatic transmission 21 is housed in an integral case 24 (refer to FIG. 5) comprising a transaxle housing, a transaxle case and a rear cover 11.

The torque converter section 22 has a torque converter 26 and a lock-up clutch 27, whereby rotation of an engine crank shaft 28 is transmitted to an input shaft 29 through the torque converter 26 hydraulically, or through a mechanical connection of the lock-up clutch 27.

The three speed automatic transmission mechanism 23 has a planetary gear unit composed of a single planetary gear 30 and a dual planetary gear 31. In the planetary gear unit, the sun gear of the two planetary gears are integrally linked to form a common sun gear S, and carriers are integrally linked to form a common carrier CR1. The input shaft 29 and a ring gear R1 of the single planetary gear 30 are connected through a first (forward) clutch C1. The input shaft 29 and a sun gear S are connected through a second (direct) clutch C2. The sun gear S is restrained directly by a first (2nd coast) brake B1 and is restrained in one-way rotation by a second (2nd) brake B2 through a first one-way clutch F1. A ring gear R2 of the dual planetary gear 31 is restrained directly by a third (1st coast & reverse) brake B3 and is restrained in one-way rotation by a second one-way clutch F2. The carrier CR1 is connected to a counter drive gear 32 which is an output member for the three speed automatic transmission mechanism 23.

The under drive mechanism 25 has a single planetary gear 33, whose ring gear R3 is connected to a counter driven gear 35 which invariably meshes with the counter drive gear 32, and a carrier CR3 is connected to an output pinion 36. Further the sun gear S3 is restrained directly by a fourth (under drive) brake B4 and is restrained by a one-way clutch F3. And the sun gear S3 is connected to the carrier CR3 through a third (under drive direct) clutch C3.

The output pinion 36 is connected to a front differential device 37 through a ring gear 38, and the differential device 37 has left and right front axle shafts 39l, 39r.

Figure 3:
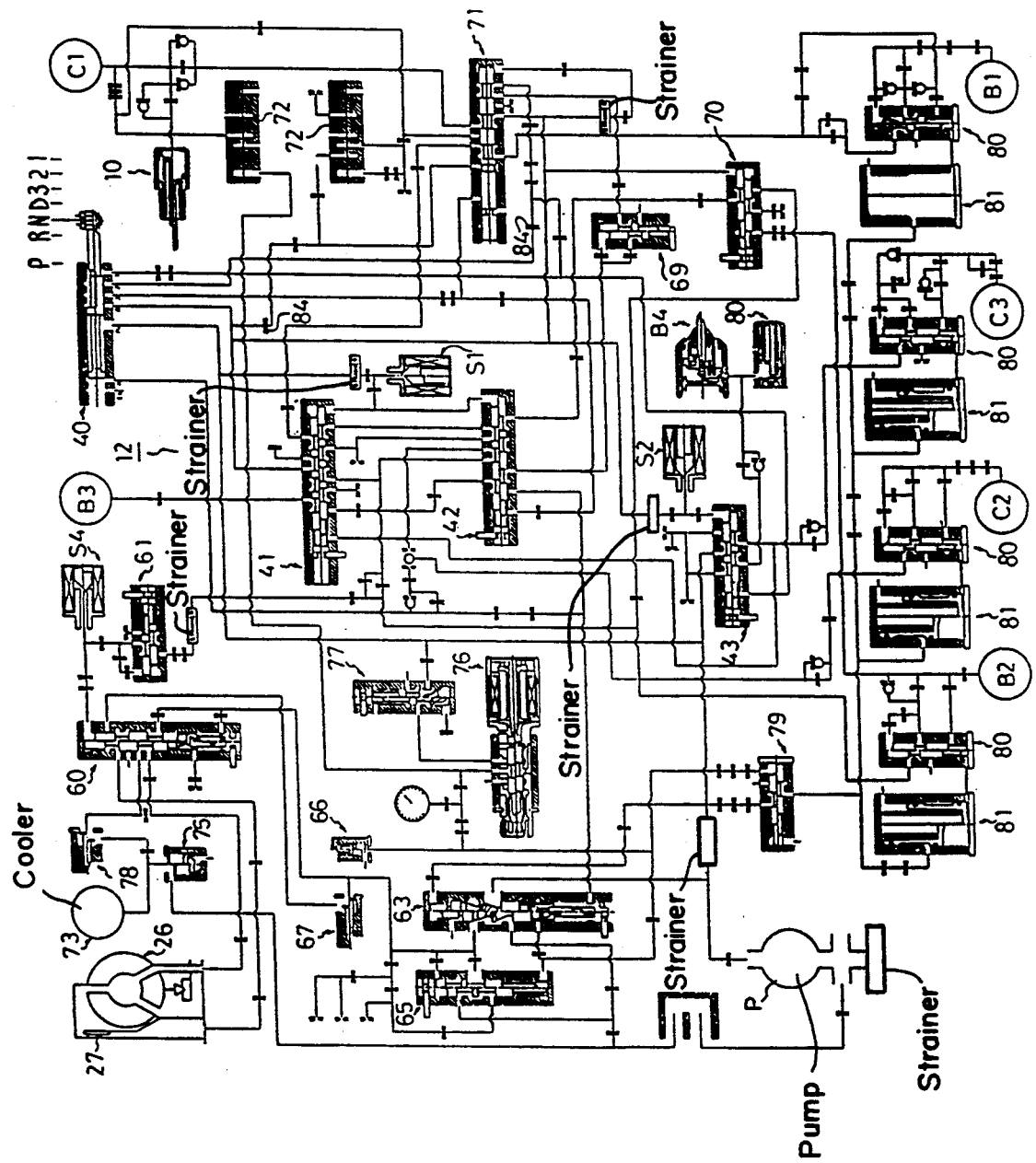

And and the four speeds automatic transmission 21, as shown in FIG. 3, is controlled by a hydraulic circuit 12.

In the circuit 12, C1, C2, C3 are hydraulic servos for the clutches $C_1$, $C_2$, $C_3$, while B1, B2, B3, B4 are hydraulic servos for the brakes $B_1$, $B_2$, $B_3$, $B_4$. 40 is a manual valve, 41 is a 1-2 shift valve composing a first shift valve, 42 is a 3-4 shift valve composing a second shift valve, and 43 is a 2-3 shift valve composing a third shift valve. S1 is a first solenoid valve controlling the 1-2 shift valve 41 and the 3-4 shift valve 42. S2 is a second solenoid valve controlling the 2-3 shift valve 43. Moreover, as shown in FIG. 3, 60 is a lock-up control valve, S4 is a fourth solenoid valve to duty-control the lock-up control valve 60, and 61 is a lock-up modulator valve to stabilize the duty-control of the solenoid valve. 63 is a primary regulator valve, 65 is a secondary regulator valve, 66 is a pressure relief valve, 67 is a check valve for the lock-up control valve 60, and 69 is a low modulator valve. 70 is a B1 sequence valve to control the operation of the first (2nd coast) brake. 71 is a 4-5 shift valve to use for a forward five speed automatic transmission, and 72 is a plug for a valve of the above five speed automatic transmission. (for example, C1 modulator valve, 2nd modulator valve) In this embodiment, a spool of the 4-5 shift valve 71 is fixed on the position shown in FIG. 3. (refer to the Japanese Laid Open Patent No. Sho-63-106447 with reference to the operation of a neutral control valve, a C1 modulator valve and 2nd modulator valve) Furthermore 73 is an oil cooler, 75 is a cooler bypass valve, 76 is a throttle valve composed of a linear solenoid valve, which is capable of controlling hydraulic pressure freely, and 77 is a solenoid modulator valve. 78 is a check valve, and 79 is an accumulator control valve. 26 is the torque converter, 27 is the lock-up clutch, and P is an oil pump. And to each of the second clutch hydraulic servo C2, the third clutch hydraulic servo C3, the first brake hydraulic servo B1 and the second brake hydraulic servo B2, a regulating valve 80 and an accumulator 81 are connected. On the other hand, an accumulator 10 is connected to the first clutch hydraulic servo C1. Incidentally, a regulating valve for the first brake hydraulic servo B1 is a type that a supplied pressure works as a spool regulating pressure, and inside of the accumulator 81 is empty.

And, a symbol 84 like a condensor mark is a separator plate blocking oil passages. Due to this configuration the hydraulic circuit for the four speed automatic transmission is capable of being used as a valve body for a five speed automatic transmission.

Figure 1:
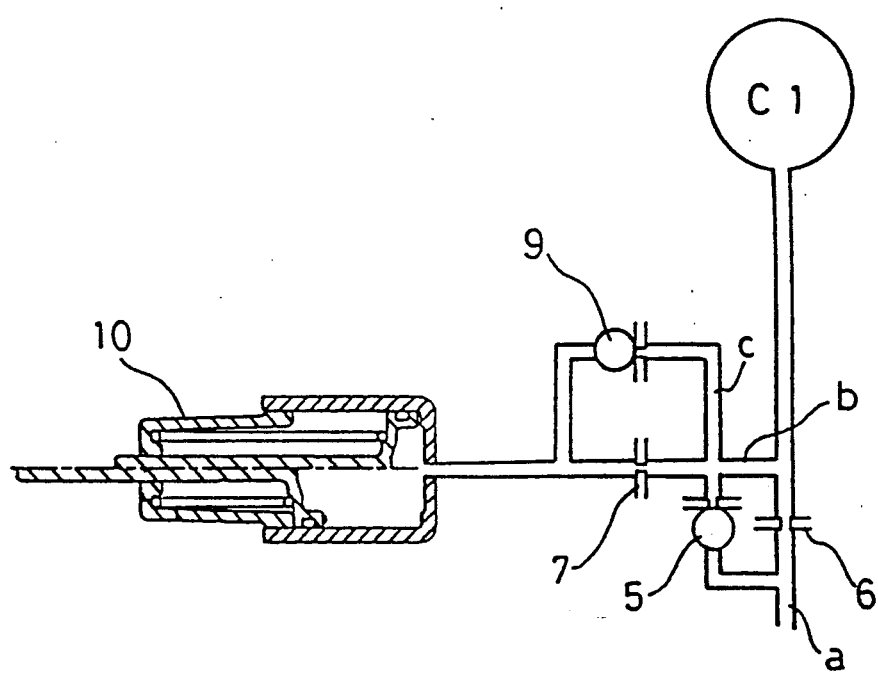
FIG. 1 is a cross sectional view of an important part of a hydraulic control device of the present invention.

As shown in FIG. 1, an oil passage a which is connected to a D range port of a manual valve 40 is connected to a first (forward) clutch hydraulic servo C1, and on the passage a, a check valve 5 and an orifice 6 are placed in parallel. And an oil passage b branched from the passage a is connected to an accumulator 10 for the first clutch hydraulic servo C1. On the passage b, an orifice 7 is placed and a check valve 9 is situated on an oil passage c which is parallel with the passage b.

Figure 6:
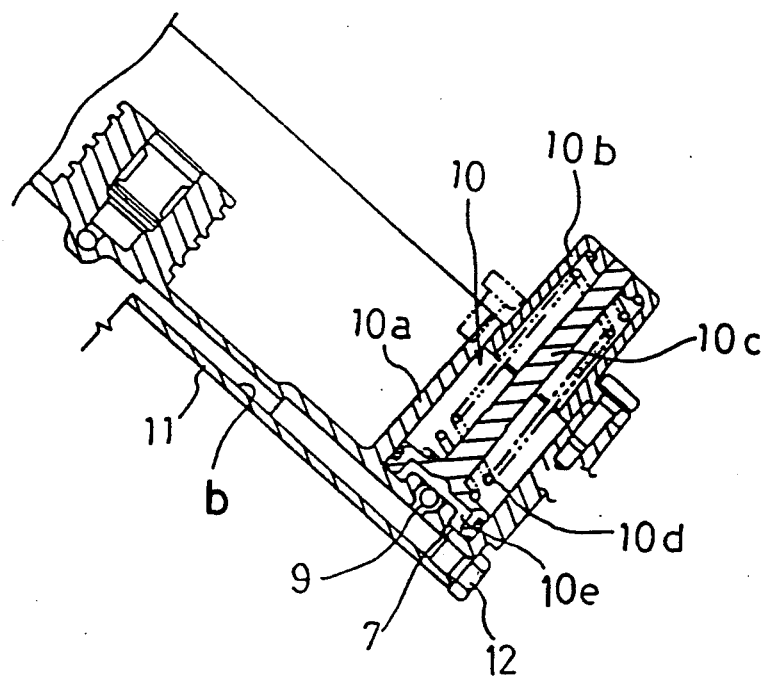
FIG. 6 is a cross sectional view of the integral case with taken along the line VI—VI of FIG. 5.
Figure 7:
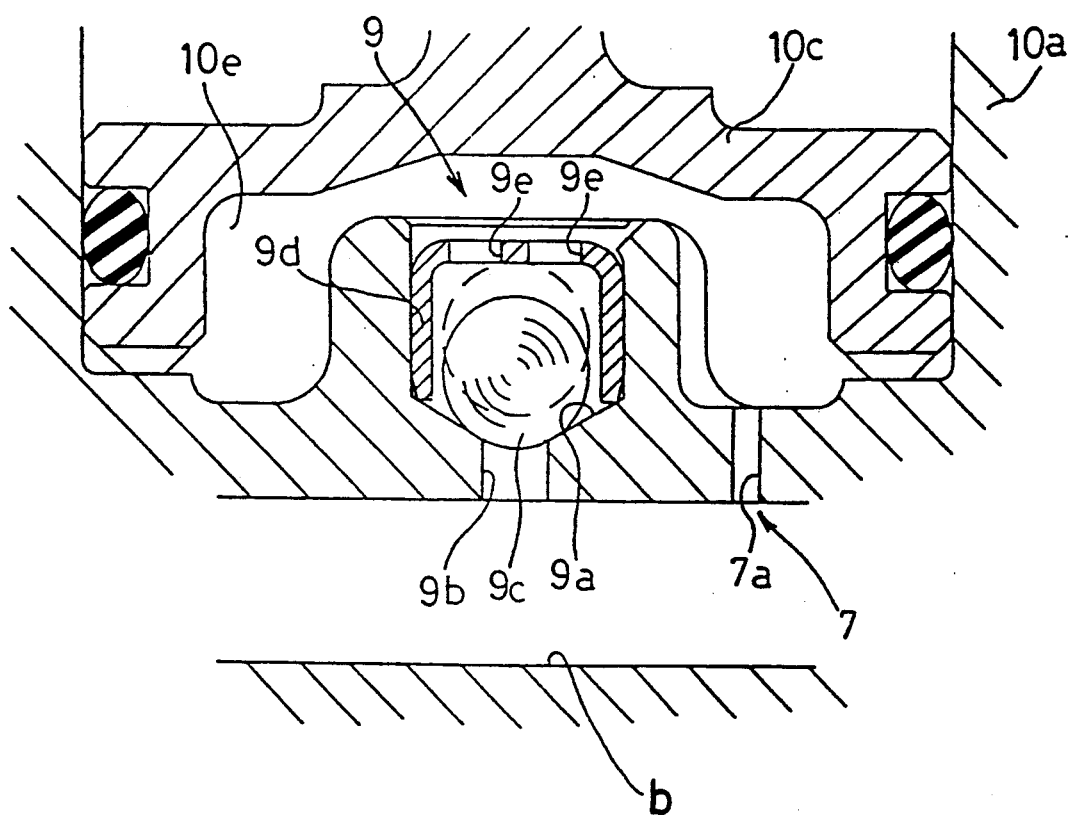
FIG. 7 is a grossly enlarged sectional view of the bottom part of the accumulator.

The oil passage b which is connected to the first (forward) clutch hydraulic servo C1, as shown in FIG. 6 and 7, is constituted in a rear cover 11. The accumulator 10 is made up by a case 10a which is constituted integrally in the rear cover 11, an end cover 10b which is fixed on the case 10a by bolts, a piston 10c and a coil spring 10d. Further, the piston 10c is pressed by the coil spring 10d and is sealingly enclosed in the case 10a to compose an oil chamber 10e.

The oil passage b which connects the first clutch hydraulic servo C1 and the accumulator 10 is made up by a hole constituted radially in the rear cover 11, and the top of the hole is closed by a plug 12. Inside the rear cover 11, a small hole 7a composing the orifice 7 and a ball supporting hole 9a composing the check valve 9 are axially constituted. As shown in FIG. 7 in detail, the ball supporting hole 9a is connected to the oil passage b through a connecting hole 9b, and the supporting hole 9a holds a ball 9c. And an opening side is covered with a cup-shape member 9d. Accordingly, by the check valve 9, oil flow from the oil passage b is allowed to pass through the connecting hole 9b and holes 9e, 9e on the cup shape member 9d to the chamber 10e of the accumulator 10, while oil flow from the accumulator 10 is blocked because the ball 9c sits on the supporting hole 9a. So the oil flow from the accumulator 10 is gradually drained through the orifice 7.

The operation of the embodiment shall be now explained.

With regard to the four speed automatic transmission 21, by shifting the manual valve 40 to each range, the first and the second solenoid valves S1, S2, and the fourth solenoid valve S4 are operated as shown in FIG.

4. Based on the motions of the solenoid valves, the clutches C1, C2 and C3, the brakes B1, B2, B3 and B4, the one-way clutches F1, F2 and F3 operate, so that shifting speed from 1st to 4th is obtained at each range P, R, D, 3, 2, 1 of the manual valve.

When the manual valve 40 is shifted from the N range to the forward range (D), the hydraulic pressure supplied from the 4-5 shift valve 71 whose spool is fixed to the oil passage "a" is supplied to the first ( forward clutch hydraulic servo C1 through the passage a. And the hydraulic pressure to the servo C1 is also supplied to the accumulator 10 through the feeder passage b which is branched from the oil passage a. At this stage, the check valve 9 opens, so that the pressure is supplied without being throttled. Due to this motion, the hydraulic pressure in the servo C1 rises in accordance with the certain characteristics of the accumulator 10, so that the first (forward) clutch $C_1$ is engaged.

Namely, at a first speed mode of D range, the first solenoid valve S1 is OFF which means a supply condition, and the second solenoid valve S2 is ON which means a drain condition. Accordingly the 1-2 shift valve 41 and the 3-4 shift valve 42 are in a upper-half position, and the 2-3 shift valve 43 is in a lower-half position. Under this condition, the line pressure from the port D of the manual valve 40 is supplied to the first clutch hydraulic servo C1, while the line pressure is applied to the fourth brake hydraulic servo B4. Because of the above motions, the first (forward) clutch $C_1$ is engaged and the fourth brake B4 operates. As a result, rotation of the input shaft 29 is transmitted to the ring gear R1 through the clutch $C_1$, and the ring gear R2 is stopped by the second one-way clutch F2, so the sun gear S idles reversely, the common carrier CR rotates in normal rotative direction with greatly reduced speed, and such reduced rotation is taken out from the counter drive gear 32 and transmitted to the counter driven gear 35 of the under drive (U/D) mechanism 25. The under drive mechanism 25 is under an under drive condition, in which the fourth brake B4 and the third one-way clutch F3 operate. Consequently, in the automatic transmission 21 as a whole, a first speed mode is obtained by the combination of a first speed of the three speed automatic transmission mechanism 23 and the under drive condition of the under drive mechanism 25.

At a second speed mode of D range from the first speed mode, the solenoid valve S1 is ON and drained. Then the 1-2 shift valve 41 and the 3-4 shift valve 42 are switched to the lower half position. The line pressure from the port D is supplied to the second brake hydraulic servo B2. Furthermore after hydraulic pressure is supplied to the servo B2, the B1 sequence valve 70 is switched to the upper-half position based on the servo B2, and the first brake hydraulic servo B1 is supplied with hydraulic pressure. Accordingly, under this condition, the second brake B2 operates in addition to the first clutch C1. Then the sun gear S is stopped by the operation of the first one-way clutch F1 based on the second brake B2, the rotation of the input shaft 29 is transmitted to the ring gear R1, and the ring gear R1 idles the ring gear R2 in normal direction and rotates the carrier CR in normal rotating direction with reduced speed. Such reduced rotation is taken out from the counter drive gear 32 and transmitted to the counter driven gear 35 of the under drive mechanism 25. The under drive mechanism 25 is under the under drive condition, so that in the automatic transmission 21 as a whole, the second speed mode is obtained by the combination of the second speed condition of the three speed automatic transmission mechanism 23 and the under drive condition of the under drive mechanism 25. Incidentally after the up shifting from the second speed to the third speed is completed, the first brake $B_1$ is engaged, so that it is possible to apply the engine brake when coasting.

At a third speed mode of D range, from the second speed mode, the second solenoid valve S2 is switched to OFF (supply condition). Then the 2-3 shift valve 43 is switched to the upper-half position. The line pressure is applied to a back control chamber of the 1-2 shift valve 41, and the third clutch hydraulic servo C3 through the 2-3 shift valve 43, and at the same time, the fourth brake hydraulic servo B4 is drained. Due to this motion, the three speed automatic transmission 23 remains under the second speed condition, and the under drive mechanism 25 is under the direct connecting condition by the release of the fourth brake B4 and the engagement of the third clutch C3. Accordingly, in the automatic transmission 21 as a whole, the third speed mode is obtained by the combination of the second speed condition of the automatic transmission mechanism 23 and the direct connecting condition of the under drive mechanism 25.

At a fourth (4th) speed mode of D range, from the third speed mode, the first solenoid valve S1 is switched to OFF (supply) condition. Then a control pressure is supplied to a front (right) control chamber of the 3-4 shift valve 42, so that the valve 42 is switched to the upper-half position. And, the control pressure is applied to a front (right) control chamber of the 1-2 shift valve 41, however, the line pressure is supplied to a back (left) control chamber of the 1-2 shift valve 41, so that the valve 41 is kept under the lower-half position by the combination of the line pressure in the chamber and the spring pressing force. Accordingly, the line pressure from the port D is supplied to the 3-4 shift valve 42 through the ports of the 1-2 shift valve 41. Furthermore, the line pressure is supplied to the regulating valve 80. And the line pressure is supplied to the second clutch hydraulic servo. Due to this, the first (forward) clutch $C_1$ and the third clutch $C_3$ are engaged, the second brake B2 operates, and in addition, the second clutch $C_2$ is engaged. Then, the rotation of the input shaft 29 is transmitted to the ring gear R1 through the first clutch $C_1$, and at the same time, transmitted to the sun gear S through the second clutch $C_2$. Accordingly each element of the planetary gear unit rotates together, and the same rotative speed as the input shaft is taken out from the carrier CR. The rotation of the counter drive gear 32 is coupled to the direct connecting condition of the under drive mechanism 25, so that the fourth speed which is the same rotation speed as the input shaft 29 is taken out from the pinion 36. In the automatic transmission 21 as a whole, the over-drive rotation is obtained based on the gear ratio of the pinion 36 and the ring gear 38.

When the manual valve 40 is shifted from the forward range (D) to the neutral range (N), the hydraulic pressure in the first (forward) clutch C1 is drained, so that the first clutch $C_1$ is released. At this moment, the pressure drained from the servo C1 is quickly drained by the check valve 5 on the oil passage a. And the hydraulic pressure drained from the accumulator 10 is gradually drained through the orifice 7 because the check valve 9 is closed. Consequently the draining hydraulic pressure from the accumulator does not influence the release of the hydraulic servo C1. Thus the accumulator 10 is gradually drained after the hydraulic servo C1 is completely drained.

Because of the above motions, the hydraulic pressure from the hydraulic servo C1 is quickly drained as shown in the draining characteristic H1 of FIG. 9 without having any influences of the draining hydraulic pressure from the accumulator 10. In particular, when the manual valve 40 is shifted suddenly from the forward range (D) to the reverse range (R) through the neutral range (N), the hydraulic pressure ($H_R$) for the hydraulic servo for the reverse range shown in FIG. 9 does not interfere with the hydraulic pressure in the servo C1, so that transmission torque Q is smoothly changed from the normal rotation side to the reverse rotation side. Thus it is possible to lighten the shift shock.

When the manual valve 40 is operated from the neutral (N) range to the reverse (R) range, the line pressure of the line pressure port $P_L$ is supplied to the regulating valve 80 through the port R of the manual valve 40 and the oil passage for reverse running, and the line pressure is supplied to the second clutch hydraulic servo C2. At the shifting from the N range to the R range, when the vehicle is parking or running at slow speed (below 7 km/h), the first solenoid valve S1 is OFF (supply condition). Accordingly the 1-2 shift valve 41 and the 3-4 shift valve 42 are under the upper-half position, and the line pressure in the oil passage for reverse running is led to the 3-4 shift valve 42, further led to the 1-2 shift valve 41 and from the valve 41 the line pressure is led to the third brake hydraulic servo B3. Due to this, in the automatic transmission 21, the second clutch C2 is engaged and the third brake B3 operates. Then the rotation of the input shaft 29 is transmitted to the sun gear S through the second clutch C2, under this condition, the ring gear R1 rotates reversely because the ring gear R2 is stopped by the third brake B3, the carrier CR rotates reversely, and the rotation of the carrier is transmitted from the counter drive gear 32 to the under drive mechanism 25.

When the shifting from the N range to the R range, in case that the vehicle runs at more than certain speed (7 km/h), based on the signals from vehicle speed sensor to the control unit (not shown), the control unit sends signals to the first solenoid valve S1. Then the first solenoid valve is switched to drain, so that the 1-2 shift valve 41 and the 3-4 shift valve 42 are switched to the lower-half position. By this the third brake hydraulic servo B3 is not supplied with the line pressure and is drained. Accordingly the third brake B3 is released, and as a result, shifting to R range when running is prevented.

When the manual valve 40 is switched to the 3 range by the operation of the shift lever or the operation of switch, the line pressure in the line pressure port $P_L$ is connected to the 3 range port in addition to the D range port. At the 3 range, the first, the second and the third speed modes are as same as those of the D range. Incidentally, when the both solenoid valves S1, S2 are off, the third speed mode is maintained.

And, when the manual valve 40 is switched to the 2 range, the line pressure from the line pressure port $P_L$ is applied to the D range port D, the 3 range port 3 and the 2 range port 2. At the 2 range, the first speed mode and the second speed mode are as same as those of the 3 range.

When the manual valve 40 is switched to the 1 range, the line pressure from the line pressure port $P_L$ is applied to the D range port D, the 3 range port 3, the 2 range port 2 and the 1 range port 1. At the 1 range, in the first speed mode, the first solenoid valve S1 is OFF (supply condition) and the second solenoid valve S2 is ON (drain condition), as same as the first speed mode of of the 2 range. Because of this, the third brake B3 operates from the first speed mode of the 1 range. Incidentally, the second speed mode of the 1 range is as same as that of the 2 range.

The above explanation is stated along with the embodiment of the automatic transmission which the applicant of the present invention has proposed in the Japanese Laid Open Patent No. Sho-62-93546, however it is also applicable for conventional Simpson type and Ravigneaux type automatic transmissions.

TECHNICAL ADVANTAGES OF THE INVENTION

As explained, on the oil passage (b) which connects certain hydraulic servo (C1) and the accumulator (10), the orifice (7) and the check valve (9) which blocks the hydraulic flow from the accumulator (10) are situated in parallel, so that when the hydraulic pressure is supplied to the servo (C1), the accumulator (10) and the hydraulic servo (C1) is connected through the check valve (9), whereby the certain frictional engaging element (C1) is smoothly engaged in accordance with the accumulator characteristics.

While when the hydraulic servo (C1) is drained, the draining oil from the accumulator (10) is gradually drained only through the orifice (7), so that the hydraulic servo (C1) is drained quickly and securely without having any influence of the draining oil from the accumulator (10).

Furthermore, in particular, in case that the hydraulic servo is for the first (forward) clutch (C1), when the manual shift lever is shifted suddenly from the forward (D) range to the reverse (R) range through the neutral range (N), an overlapping state, in other words, torque transmission by both the first clutch (C1) and the frictional engaging element for reverse running, is securely prevented, and the shift shock at the shifting of the manual shift lever is prevented.

In case that the accumulator (10) is situated in the rear cover (11), and the oil passage (a) which is constituted radially in the cover (11) is connected to both the hole (7a) for the orifice (7) and the hole (9a) for the check valve (9), the assembly performance and maintainability of the accumulator (10) is improved because the rear cover is removable.

What is claimed is:

1. A hydraulic control device for an automatic transmission having a hydraulic pressure source and a drain line, comprising:

a manual valve having forward positions and a reverse position, said manual valve having a forward port hydraulically connected to the hydraulic pressure source at the forward positions, a hydraulic servo for a forward clutch engaging at forward running, said hydraulic servo having a fluid passage selectively connected to the forward port of the manual valve and to the drain line, fluid from the hydraulic pressure source being supplied to the hydraulic servo through the forward port at the forward positions of the manual valve, and fluid in the hydraulic servo being drained to the drain line at the reverse position of a rear cover for the automatic transmission, branch passage means branched from the fluid passage and situated in the rear cover adjacent the hydraulic servo for the forward clutch, an accumulator connected to the rear cover and comprising a spring-biased piston defining, within said accumulator, a chamber of variable volume in communication with the branch passage means, said accumulator being hydraulically connected to the hydraulic servo and forward port, a check valve including a ball and a seat for said ball and installed in a first passage running through said rear cover and connecting said branch passage means with said chamber, said check valve allowing fluid to pass toward the accumulator and preventing fluid from flowing from the accumulator, said first passage having an enlarged portion containing said ball and forming said valve seat for said ball, a cup-shaped member with holes therethrough covering said enlarged portion to retain said ball therein, and an orifice formed as a second passage through said rear cover and providing fluid communication between said branch passage and said chamber in parallel with said first cover passages and said check valve, so that the accumulator receives and holds oil when oil is supplied to the hydraulic servo for the forward clutch, and the accumulator is prevented from affecting draining of the hydraulic servo for the forward clutch by means of the check valve and the orifice when oil is quickly released from the hydraulic servo for the forward clutch.

2. A hydraulic control device for an automatic transmission according to claim 1, further comprising a second orifice situated in the fluid passage, and a second check valve situated in the fluid passage parallel to the second orifice, said second orifice and second check valve being situated in the fluid passage between the hydraulic pressure source and where the branch passage branches.

3. A hydraulic control device for an automatic transmission according to claim 1, further comprising a hydraulic servo for a second clutch operating at reverse running, shift shock being substantially reduced when shifting from said forward clutch to said second clutch.

* * * * *

UNITED STATES PATENT AND TRADEMARK OFFICE
CERTIFICATE OF CORRECTION

PATENT NO. : 5,092,201
DATED : March 3, 1992
INVENTOR(S) : HAYAKAWA et al

It is certified that error appears in the above-identified patent and that said Letters Patent is hereby corrected as shown below:

Col. 2, line 51, delete "i" insert --is--;

line 58, delete "with".

Col. 3, line 17, delete "gear" insert --gears--;

line 45, delete "and" and delete "speeds" insert --speed--;

line 50, delete "1-2shift" insert --1-2 shift--.

Col. 5, line 9, delete "(forward" insert --(forward)--;

line 46, after "range" insert a comma --,--.

UNITED STATES PATENT AND TRADEMARK OFFICE
CERTIFICATE OF CORRECTION

PATENT NO. : 5,092,201
DATED : March 3, 1992
INVENTOR(S) : HAYAKAWA et al

It is certified that error appears in the above-identified patent and that said Letters Patent is hereby corrected as shown below:

IN THE CLAIMS:

Col. 8, line 67, after "of" insert --the manual valve--.

Col. 10, line 1, delete "passages" insert --passage--;
    line 17, after "branches" insert --to the accumulator--.

Signed and Sealed this

Third Day of August, 1993

Attest:

*Attesting Officer*

MICHAEL K. KIRK

*Acting Commissioner of Patents and Trademarks*